June 5, 1956  C. H. MUELLER ET AL  2,748,893
LUBRICATION SYSTEMS
Filed March 30, 1953
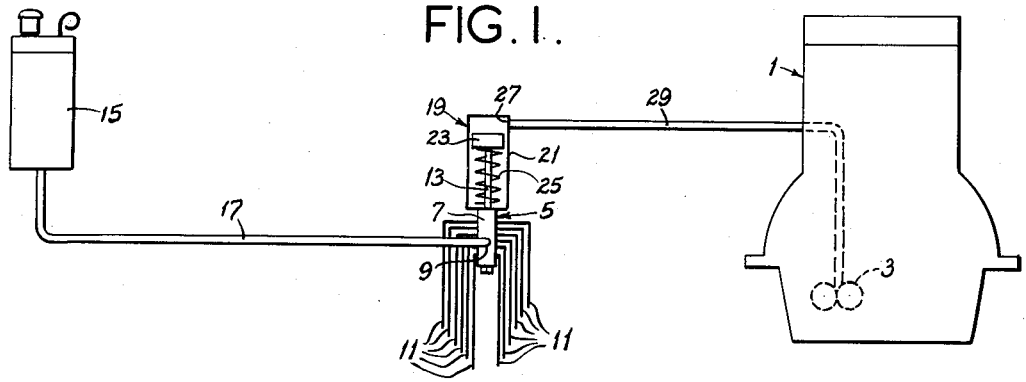
FIG. 1.
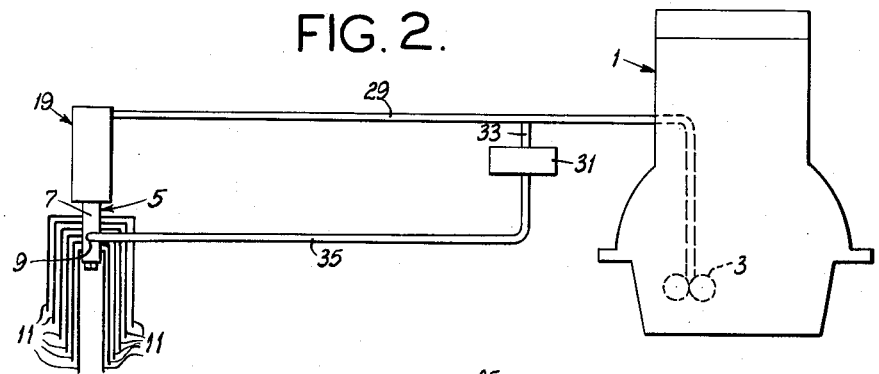
FIG. 2.
FIG. 4.   FIG. 3.
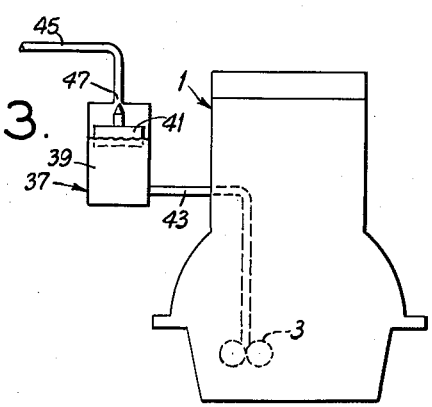
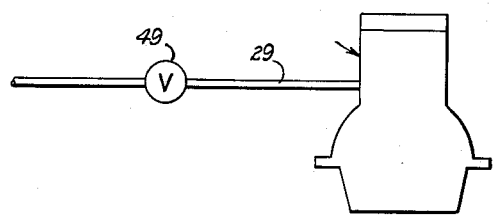
FIG. 5.
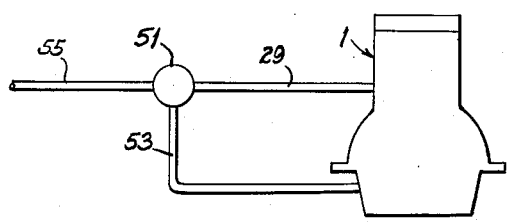
Carl H. Mueller,
Rudy F. Schneller,
Inventors.
Koenig and Pope,
Attorneys.

United States Patent Office 2,748,893
Patented June 5, 1956

2,748,893

LUBRICATION SYSTEMS

Carl H. Mueller, St. Louis, and Rudy F. Schneller, O'Fallon, Mo., assignors to Lincoln Engineering Company, St. Louis, Mo.

Application March 30, 1953, Serial No. 345,304

12 Claims. (Cl. 184—7)

This invention relates to lubrication systems, and more particularly to force-feed lubrication systems for intermittently delivering measured charges of lubricant to bearings or other points of lubrication.

Among the several objects of the invention may be noted the provision of a simplified, reliable, force-feed system for intermittently and automatically effecting delivery of measured charges of lubricant in response to operation of the device serviced by the system; the provision of a lubrication system of this class for use in conjunction with an engine-driven device including a fluid pump driven by the engine and wherein lubrication is effected in response to development and venting of fluid pressure occasioned by starting and stopping of the engine and the pump; the provision of a lubrication system of this class for use in conjunction with an engine-driven device, such as a motor vehicle, which has an oil pump for effecting engine lubrication, wherein other points of lubrication are serviced with measured charges of lubricant in response to development and venting of pressure occasioned by starting and stopping of the engine and the oil pump; the provision of a lubrication system of the latter class wherein the same oil as delivered by the oil pump is utilized as the lubricant for said other points; and the provision of a lubrication system such as described having means for controlling the periodicity of lubrication at will. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, Fig. 1 is a semi-diagrammatic view of one type of lubrication system of this invention;

Fig. 2 is a semi-diagrammatic view illustrating a second type of system; and,

Figs. 3–5 are fragmentary semi-diagrammatic views illustrating modifications.

Corresponding reference characters indicate corresponding parts throughout the several views of the drawings.

Referring to Fig. 1, there is generally indicated at 1 the internal combustion engine of an engine-driven device such as a conventional motor vehicle. Such vehicles invariably have an oil pump driven by the engine for effecting engine lubrication, and such a pump is indicated at 3. It will be understood that when the engine is in operation the oil pump maintains a circulation of oil under pressure from the crankcase of the engine to various parts of the engine, spent oil returning to the crankcase.

At 5 is shown a multiple lubricant injector which may be of the type shown in any one of the following co-assigned, copending applications: Klein et al., Serial No. 240,382, filed August 4, 1951, for Injector (issued as Patent No. 2,686,476, August 17, 1954); Klein et al., Serial No. 255,828, filed November 10, 1951, for Injectors; Rotter, Serial No. 255,863, filed November 10, 1951, for Injector (issued as Patent No. 2,694,977, November 23, 1954). In general, the injector comprises a cylinder 7 having a lateral inlet port at 9 and a plurality of axially spaced lateral outlet ports from which lubricant delivery lines 11 lead to the various points of lubrication of the vehicle to be serviced by the injector. Working in the cylinder is a plunger 13 which, within the cylinder, is so passaged and ported that when driven from a retracted position through a working stroke it forces individual measured charges of lubricant successively from the several lateral outlet ports and through the delivery lines 11. When the plunger is in retracted position, the cylinder is recharged with lubricant via the lateral inlet port 9. Full details of the injector may be ascertained from said copending applications. As shown in Fig. 1, the injector 5 is supplied with lubricant from a lubricant reservoir 15 through a supply line 17 connected to the lateral inlet port of the injector.

The plunger 13 is actuated by a fluid-pressure-operated reciprocating motor generally designated 19 and comprising a cylinder 21 and a piston 23 working in the cylinder and coupled to the plunger. The plunger is biased toward its retracted position by a spring 25 in the motor cylinder 21 acting against the piston 23. The piston is adapted to be driven toward the injector to drive the plunger through a working stroke by admission of fluid under pressure through a port 27 at the end of the cylinder 21 away from the injtctor. An oil line 29 connects the outlet of oil pump 3 to the motor cylinder port 27.

The above-described arrangement is such that when the engine 1 is out of operation, with oil pump 3 accordingly out of operation, there is no pressure in line 29 and the injector plunger 13 is held in its retracted position by spring 25. The injector is charged with lubricant from the reservoir 15. Then, when the engine 1 is started, and oil pump 3 is accordingly operated, oil is delivered via line 29 to the motor cylinder 21 and pressure builds up to the point where the piston 23 is driven forward (downward as viewed in Fig. 1) against the bias of the spring 25 to drive the plunger 13 of the injector through a working stroke. This results in delivery of individual measured charges of lubricant through the delivery lines 11. The injector plunger 13 is held in a forward (downward as viewed in Fig. 1) position as long as engine 1 and oil pump 3 are in operation. Then, when the engine 1 is shut off, and pump 3 stops, the pressure acting on the piston 23 is vented through the pump back to the engine crankcase, and the spring 25 returns the injector plunger 13 to its retracted position, whereupon the injector is recharged with lubricant from reservoir 15 and readied for the next cycle of operation.

Fig. 2 illustrates a system similar to the Fig. 1 system except that engine oil is taken for delivery by the injector 5 through the service lines 11. This eliminates the need for a separate lubricant reservoir requiring periodic checking and filling. The Fig. 2 system differs from the Fig. 1 system in that the lubricant reservoir 15 and line 17 are eliminated and in that engine oil is supplied to the injector from a constantly filled oil trap 31 having a connection 33 to oil pressure line 29 and from which trap an oil supply line 35 leads to the inlet port 9 of the injector. The trap 31 is simply a receptacle located below the level of flow in oil pressure line 29. It is used because line 29 drains when the engine 1 is shut off and pump 3 stops. In draining, the line 29 becomes charged with air, and if it were directly connected to the injector inlet without a trap, a mixture of oil and air would be drawn into the injector, resulting in unpredictable lubrication delivery through lines 11. The use of the trap 31 avoids this.

Fig. 3 illustrates a modification involving the provision of a safety valve device generally designated 37 for eliminating the danger of engine damage possible in the Figs. 1 and 2 systems if oil pressure line 29 should break, resulting in complete loss of engine oil. The safety valve device 37 comprises a float chamber 39 containing a float valve 41. The lower end of chamber 39 is directly coupled to an oil outlet in the block of engine 1 by a connection 43 of such nature as to minimize the chances of occurrence of leakage between the block and the chamber. A line 45 leads from a port 47 in the top of the float chamber to the motor cylinder port 27 (not shown in Fig. 3 but shown in Figs. 1 and 2). The float valve 41 is adapted upon rising to close the port 47.

The Fig. 3 arrangement is such that when the engine 1 is started and the oil pump 3 is driven, the oil pump delivers oil under pressure to the float chamber 39 via connection 43. As the oil fills the chamber 39, float valve 41 rises. Air compressed in the chamber 39 above the float valve and in line 45 acts on the motor piston 23 to drive it and the injector plunger 13 through a working stroke. The oil pressure in chamber 39 and the air pressure in line 45 are equalized, and so remain until the engine 1 is shut off. Whereupon, the oil in chamber 39 returns through the oil pump to the engine crankcase, the float valve descends, and air pressure in line 45 is relieved to allow spring 25 to return the motor piston 23 and the injector plunger 13 to retracted position for recharging of the injector.

The size of chamber 39 is such as to provide for a sufficient volume of air to be compressed for actuating the injector before the float valve 41 closes port 47. In the event of breakage of line 45 or actuating piston failure, no oil will be lost from the engine because the oil level in chamber 39 will simply rise until the float valve 41 closes port 47, thereby blocking off line 45. When the engine is shut off, and the oil returns from chamber 39 to the engine crankcase, any air loss from chamber 39 and line 45 is replenished.

Figs. 4 and 5 illustrate modifications for enabling control of the periodicity of lubrication at will. It will be noted that the above-described systems effect lubrication every time the engine 1 is started. In cases where numerous engine starts are made and short distances traveled, this periodicity of lubrication may be excessive. Fig. 4 shows a simple shut-off valve 49 installed in the oil pressure line 29 of either of the Fig. 1 or 2 systems which may be closed to block line 29 to preclude operation of the injector except when desired. Fig. 5 shows a three-way valve 51 installed in the oil pressure line 29 of either the Fig. 1 or 2 systems with a by-pass line 53 back to the engine crankcase. The line 55 leads from the valve to the injector motor. The valve 51 may be set to block line 29 and vent oil in line 55 to the crankcase via line 53, thereby to preclude operation of the injector, or set to open line 29 and block line 53 to allow operation of the injector.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A lubrication system for a device having means including a pump for pumping liquid under pressure, said system comprising said pump, a lubricant injector, a source of lubricant, said injector having a plunger movable from a retracted position through a working stroke to force lubricant to various points of lubrication, means biasing the plunger in one direction, a fluid-pressure-operated motor for driving the plunger in the other direction against the bias, means receiving liquid under pressure from the pump and translating the liquid pressure to air pressure, means connecting the translating means and the motor for supplying the air pressure to the motor to operate the injector, and means for blocking the connecting means upon loss of air pressure in the connecting means.

2. A lubrication system for a device having means including a pump for pumping liquid under pressure, said system comprising said pump, a lubricant injector, a source of lubricant, said injector having a plunger movable from a retracted position through a working stroke to force lubricant to various points of lubrication, means biasing the plunger in one direction, a fluid-pressure-operated motor for driving the plunger in the other direction against the bias, and means connecting the pump and motor for supplying pressure to the motor upon operation of the pump comprising a float chamber, a line connecting the pump to the lower end of the float chamber, a line connecting a port in the top of the chamber to the motor, and a float valve in the chamber adapted to close the port upon the rise of liquid in the chamber, the rise of liquid compressing air in the chamber and the line to the motor to operate the motor before the float valve closes the port.

3. In a lubrication system, a lubricant injector comprising a cylinder having a lateral inlet port and a plurality of axially spaced lateral outlet ports, a plunger movable in the cylinder from a retracted position through a working stroke to force individual measured charges of lubricant successively through the outlet ports, means biasing the plunger in one direction, a motor adapted to be operated by lubricant under pressure for driving the plunger in the other direction against the bias, means for developing a venting lubricant pressure including a lubricant pump, and means connecting said lubricant pressure developing and venting means to the injector inlet and to the motor for supplying lubricant to the injector and for supplying lubricant under pressure to and venting the motor.

4. A lubrication system for an engine-driven device, said device including an oil pump driven by the engine for lubricating the engine, said system comprising said oil pump, a lubricant injector comprising a cylinder having a lateral inlet port and a plurality of axially spaced lateral outlet ports, a plunger movable in the cylinder from a retracted position through a working stroke to force individual measured charges of lubricant successively through the outlet ports, a source of lubricant connected to the injector inlet port, means biasing the plunger in one direction, a fluid-pressure-operated expansible-chamber type motor for driving the plunger in the other direction against the bias, and means connecting the oil pump and the motor for supplying pressure to the motor upon operation of the pump.

5. A lubrication system as set forth in claim 4 further comprising means for blocking the supply of fluid pressure to the motor at will.

6. A lubricating system as set forth in claim 4 further comprising a valve in the means connecting the pump and the motor for blocking the supply of pressure to the motor at will.

7. A lubrication system as set forth in claim 4 further comprising means connected in the means connecting the pump and motor for blocking flow of pressure from the pump to the motor and venting the motor.

8. A lubrication system for an engine-driven device, said device including an oil pump driven by the engine for lubricating the engine, said system comprising said oil pump, a lubricant injector comprising a cylinder having a lateral inlet port and a plurality of axially spaced lateral outlet ports, a plunger movable in the cylinder from a retracted position through a working stroke to force individual measured charges of lubricant successively through the outlet ports, a source of lubricant connected to the injector inlet port, means biasing the plunger in one direction, an expansible-chamber type motor adapted to be operated by oil under pressure for driving the plunger in the other direction against the bias, and means connecting the oil pump and the motor for supplying oil under pressure to the motor upon operation of the pump.

9. A lubrication system for an engine-driven device, said device including an oil pump driven by the engine for lubricating the engine, said system comprising said oil pump, a lubricant injector comprising a cylinder having a lateral inlet port and a plurality of axially spaced lateral outlet ports, a plunger movable in the cylinder from a retracted position through a working stroke to force individual measured charges of lubricant successively through the outlet ports, means biasing the plunger in one direction, a fluid-pressure-operated expansible-chamber type motor for driving the plunger in the other direction against the bias, means connecting the oil pump and the motor for supplying pressure to the motor upon operation of the pump, and means for receiving oil from the pump and supplying it to the injector inlet port.

10. A lubrication system as set forth in claim 9 wherein said means for receiving oil includes a trap adapted to remain filled with oil to prevent mixture of air with the oil supplied to the injector.

11. A lubrication system for an engine-driven device, said device including an oil pump driven by the engine for lubricating the engine, said system comprising said oil pump, an oil injector comprising a cylinder having a lateral inlet port and a plurality of axially spaced lateral outlet ports, a plunger movable in the cylinder from a retracted position through a working stroke to force individual measured charges of lubricant successively through the outlet ports, means biasing the plunger in one direction, an expansible-chamber type motor adapted to be operated by oil under pressure for driving the plunger in the other direction against the bias, means connecting the oil pump and the motor for supplying oil under pressure to the motor upon operation of the pump, and means for receiving oil from the pump and supplying it to the injector inlet port.

12. A lubrication system as set forth in claim 11 wherein said means for receiving oil includes a trap adapted to remain filled with oil to prevent mixture of air with the oil supplied to the injector.

References Cited in the file of this patent

UNITED STATES PATENTS

| | | |
|---|---|---|
| 1,742,446 | Manzel | Jan. 7, 1930 |
| 1,875,706 | Cowles | Sept. 6, 1932 |
| 2,029,198 | Ross | Jan. 28, 1936 |

FOREIGN PATENTS

| | | |
|---|---|---|
| 259,660 | Italy | July 21, 1928 |